United States Patent
Hascoet et al.

(10) Patent No.: US 10,766,200 B2
(45) Date of Patent: Sep. 8, 2020

(54) METHOD AND SYSTEM FOR ADJUSTING AN ADDITIVE MANUFACTURING DEVICE

(71) Applicant: ECOLE CENTRALE DE NANTES, Nantes (FR)

(72) Inventors: Jean-Yves Hascoet, Nantes (FR); Gilles Carabin, Germain St Moine (FR)

(73) Assignee: ECOLE CENTRALE DE NANTES, Nantes (FR)

( * ) Notice: Subject to any disclaimer, the term of this patent is extended or adjusted under 35 U.S.C. 154(b) by 135 days.

(21) Appl. No.: 16/064,446

(22) PCT Filed: Dec. 31, 2016

(86) PCT No.: PCT/EP2016/082951
§ 371 (c)(1),
(2) Date: Sep. 28, 2018

(87) PCT Pub. No.: WO2017/114965
PCT Pub. Date: Jul. 6, 2017

(65) Prior Publication Data
US 2019/0193334 A1  Jun. 27, 2019

(30) Foreign Application Priority Data
Dec. 31, 2015  (FR) .................................... 15 02754

(51) Int. Cl.
*B29C 64/393* (2017.01)
*B29C 64/268* (2017.01)
(Continued)

(52) U.S. Cl.
CPC ............ *B29C 64/393* (2017.08); *B05B 7/228* (2013.01); *B22F 3/1055* (2013.01);
(Continued)

(58) Field of Classification Search
CPC ... B29C 64/393; B29C 64/153; B29C 64/268; B05B 7/228; G05B 19/401; G05B 19/18;
(Continued)

(56) References Cited

U.S. PATENT DOCUMENTS 5,396,333 A * 3/1995 Aleshin .............. B23K 26/1494
                                                        219/121.83
5,593,531 A * 1/1997 Penn .................... G03G 15/221
                                                         156/272.6
(Continued)

FOREIGN PATENT DOCUMENTS

DE  10 2005 058172 A1  6/2007
DE  10 2007 032190 A1  1/2009

*Primary Examiner* — Charles R Kasenge
(74) *Attorney, Agent, or Firm* — Im IP Law; Chai Im; C. Andrew Im

(57) ABSTRACT

A system to adjust and measure an additive manufacturing device via the CLAD method. The system includes a powder spray nozzle and a laser beam passing through the center of the nozzle, and a light source providing a light beam substantially perpendicular a lighting plane. The light source includes a support to position the light source with respect to a material surface. A profile camera is installed such that its optical axis is substantially parallel to the lighting plane. A projector to project a view seen by the center of the nozzle on an optical path and an optical axis of a centering camera is placed on the optical path. A low-power laser shot perforates a target. An acquisition and processing unit collects the images from the two cameras.

11 Claims, 2 Drawing Sheets

(51) Int. Cl.
 *B29C 64/153* (2017.01)
 *G06T 7/00* (2017.01)
 *G06T 7/62* (2017.01)
 *B33Y 50/02* (2015.01)
 *B05B 7/22* (2006.01)
 *G05B 19/401* (2006.01)
 *B22F 3/105* (2006.01)
 *G05B 19/18* (2006.01)
 *B33Y 10/00* (2015.01)
 *B33Y 30/00* (2015.01)

(52) U.S. Cl.
 CPC .......... *B29C 64/153* (2017.08); *B29C 64/268* (2017.08); *B33Y 50/02* (2014.12); *G05B 19/18* (2013.01); *G05B 19/401* (2013.01); *G06T 7/001* (2013.01); *G06T 7/62* (2017.01); *B22F 2003/1057* (2013.01); *B33Y 10/00* (2014.12); *B33Y 30/00* (2014.12); *Y02P 10/295* (2015.11)

(58) Field of Classification Search
 CPC .......... G06T 7/62; G06T 7/001; Y02P 10/295; B33Y 10/00; B33Y 30/00; B33Y 50/02; B22F 2003/1057; B22F 3/1055
 See application file for complete search history.

(56) References Cited

U.S. PATENT DOCUMENTS

| | | | | |
|---|---|---|---|---|
| 6,940,037 | B1* | 9/2005 | Kovacevic | B23K 9/044 |
| | | | | 219/121.64 |
| 9,696,142 | B2* | 7/2017 | Bamberg | G01B 11/162 |
| 10,048,661 | B2* | 8/2018 | Arthur | G05B 19/401 |
| 10,379,517 | B2* | 8/2019 | Shapiro | B23K 26/08 |
| 10,496,070 | B2* | 12/2019 | Shapiro | B23K 26/082 |
| 2006/0081571 | A1* | 4/2006 | Hoebel | B23K 26/032 |
| | | | | 219/121.64 |
| 2015/0048064 | A1* | 2/2015 | Cheverton | B22F 3/1055 |
| | | | | 219/121.63 |
| 2015/0165683 | A1* | 6/2015 | Cheverton | G06T 7/0004 |
| | | | | 382/141 |
| 2016/0114431 | A1* | 4/2016 | Cheverton | B23K 26/342 |
| | | | | 219/76.1 |

* cited by examiner

METHOD AND SYSTEM FOR ADJUSTING AN ADDITIVE MANUFACTURING DEVICE

RELATED APPLICATIONS

This application is a § 371 application from PCT/EP2016/082951 filed Dec. 31, 2016, which claims priority from French Patent Application No. 15 02754 filed Dec. 31, 2015, each of which is herein incorporated by reference in its entirety.

FIELD OF THE INVENTION

The invention relates to a method and a system for the adjusting of an additive manufacturing device. The invention is more particularly suited for a method of additive manufacturing called CLAD®, acronym for "Construction Laser Additive Directe", consisting in building an object by the deposition of a powdery material which is melted by a laser.

BACKGROUND OF THE INVENTION

FIG. 1, relative to prior art, diagrammatically shows an embodiment of this method. According to this embodiment, the depositing of material is carried out by way of a powder spray/fuse nozzle (100) comprising 3 concentric cones delimiting between their walls tapered annular spaces that are also concentric. A laser (150) passes through the inner cone (130) through a bore centred on the axis of said cone. The laser is focused on the point (191) where the depositing (192) of material is carried out on the object (190) being manufactured. Powder (160) is sprayed in the tapered annular space between the inner surface of the outer cone (110) and the outer surface of an intermediate cone (120), while a gas is blown into the tapered annular space between the inner surface of said intermediate cone (120) and the outer surface of the inner cone (130). The centring of the cones (110, 120, 130) in relation to one another and the adjusting of the parameters result in that the powder is sprayed according to a hollow conical stream of which the apex is, ideally, confounded with the focal point (191) of the laser (150). The distance (193) between the point (191) of material deposition and the front end of the outer cone (110) is commonly about 5 mm, without this value to be considered as exhaustive or as a limitation.

The implementation of such a method requires precise knowledge of the shape of the cone of sprayed material and a perfect centring of said cone in relation to the laser beam. More particularly in the framework of manufacturing an object that requires the implementation of complex trajectories that comprise, for example, constant variations in the orientation of the stream of powder in space, requires a perfect knowledge of the length of said cone, of the position of its centre and even of the shape of this cone. These parameters are in particular generated in a numerical control machine by way of parameters referred to as correctors or tool gauges, making it possible to control the axes appropriately, so as to respect a program that defines the movements via the displacement of the point of deposition and the orientation of the spray relative to the manufactured surface. For this purpose, it is necessary to know the relative position of this point of deposition and focal point of the laser in the system of coordinates of the machine. These programming and controlling techniques, identical to those used in the framework of manufacturing by material removal, are known from prior art and no further details are provided. In the field of material removal, the tool gauge parameters are deduced directly from the measurement of the physical tool, either outside of the machine, or in the machine.

In the case of additive manufacturing, more particularly in the framework of the CLAD method, the dimensions of the spray cone are given by the parameters for implementing the method, such as the gas flow rate and the nature of the powder sprayed, or, by the adjusting of the cones of the nozzle. Therefore, it is not possible to measure a tool gauge parameter, such as the position of the axis of the spray cone in the system of coordinates of the machine and the length of the spray cone, or to adjust the shape of said spray cone without implementing the spray method.

According to a method of prior art, the position of the axis of the laser is obtained by carrying out a low-energy shot on an adhesive strip stuck on the end of the nozzle. The end of the nozzle leaves a trace on the adhesive portion, and the laser shot makes a hole in the strip. This method makes it possible to adjust the concentricity of the two marks: the hole and the trace of the nozzle, by acting on the appropriate settings of the cones of the nozzle. This is in any case an indirect measurement which has to be repeated several times in order to carry out the adjustment. The quality of the adjustment is random, and even an experienced operator cannot claim a repeatability error less than 0.5 mm. In any case, this prior art technique does not make it possible to determine the tool gauge, i.e. the length and, if needed, the shape of the spray cone.

OBJECT AND SUMMARY OF THE INVENTION

The invention aims to overcome the disadvantages of prior art and for this purpose relates to a system for the adjusting and the measuring of an additive manufacturing device, in particular via the CLAD method, comprising a powder spray nozzle and a laser beam passing through the centre of said nozzle, said device comprising:

a. a light source comprising:

ai. means for positioning said light source with respect to a material surface;

aii. lighting means for delivering a light beam substantially perpendicular to a plane, referred to as the lighting plane;

b. a picture taking device, referred to as a profile camera, installed in such a way that its optical axis is substantially parallel to the lighting plane;

c. an optical path device able to project the view seen by the centre of the spray nozzle;

d. a second picture taking, referred to as centring camera, with its optical axis being on the optical path;

e. a target able to be marked by a low-power laser shot;

f. an acquisition and processing unit able to collect the images coming from the picture taking devices.

As such, the system object of the invention makes it possible to obtain images of the stream of powder and of the laser beam and to materialise the position of the powder spray orifice by the light beam passing through the nozzle and the centring of the laser by the marking of the target. The device makes it possible to check the centring of the nozzle and of the laser in real time without having to carry out another shot or to re-install the device.

The invention is advantageously implemented according to the embodiments and alternatives disclosed hereinafter, which are to be considered individually or according to any technically operative combination.

Advantageously, the light source comprises a plurality of light-emitting diodes according to an annular arrangement in the lighting plane. This embodiment makes it possible to obtain a lighting without a shadow and the annular arrangement makes it possible to centre the nozzle with respect to this lighting in such a way that the image of the spray orifice on the centring camera is uniformly lit, while the focal point of the laser beam remains sufficiently dark to be able to be viewed.

According to an improved embodiment, the system of the invention comprises:

g. a third picture taking device, with its optical axis parallel to the lighting plane and perpendicular to that of the profile camera.

This embodiment makes it possible to measure the shape of the stream of powder and the alignment of its profile with the laser according to two planes. The adjusting of the shape of the stream of powder is carried out by varying the flow rates of powder and gas. As such the system object of the invention allows for a three-dimensional measurement and adjustment of the geometry of the spray/fusion.

The invention also relates to a method for the adjusting and the measuring of a material spray/fuse device, in particular via the CLAD method, by means of a system according to the invention, said method comprises the steps consisting in:

i. positioning the spray nozzle above the lighting plane according to an orientation that is substantially normal to said plane;

ii. placing the target between the outlet of the nozzle and the lighting plane in such a way that said target intercepts a laser shot;

iii. carrying out a low-power laser shot;

iv. lighting the end of the nozzle by means of the light source;

v. obtaining the image through the end of the nozzle by the centring camera, of the mark left by the laser shot on the target, while the end of the nozzle is lit.

This method makes it possible to obtain an image of the position of the powder spray orifice, which appears as an illuminated ring, with respect to the axis of the laser beam, materialised by the mark left by the laser on the target, without removing said target, as well as viewing the modifications of this position at the time of each adjustment, by the displacement of the illuminated ring, thus making the adjustment of the nozzle easier.

According to an alternative of the method of the invention, the target is stuck on the end of the nozzle.

According to another alternative of the method of the invention, the target is held on the lighting plane.

The possibility of vision through the nozzle conferred by the centring camera and the optical path of the device of the invention, makes it possible to implement the method of the invention with the target placed between these two ends, or any position between the latter.

Advantageously, the method of the invention comprises the steps consisting in:

vi. measuring the centring error between the contour of the lit space and the image of the mark left by the laser on the target, on the image obtained in the step v);

vii. calculating the adjustment in order to correct the centring error.

These steps, implemented by the acquisition and processing means, make it possible, according to the adjustment device of the machine, to automatically determine the corrections to be made.

Advantageously, the method of the invention comprises the steps consisting in:

viii. carrying out a spraying of powder;

ix. obtaining the image of the sprayed powder by the profile camera.

Thus, the method of the invention makes it possible to view the shape of the stream of powder. Therefore, the method of the invention advantageously comprises the steps consisting in:

x. determining the shape of the image of the stream of powder from a predetermined profile on the image obtained in the step ix);

xi. deducing from step x) the tool gauges corresponding to the stream.

Thus, the method object of the invention makes it possible to obtain precise tool gauges in order to improve the manufacturing quality of the items.

Advantageously, the method of the invention further comprises the steps consisting in:

xii. generating a laser beam during step viii)

xiii. measuring on the image obtained in step ix) the orientation deviation of the image of the stream of powder with respect to the image of the laser beam;

xiv. deducing from the results of step xii) the adjustments to be carried out in order to correct the orientation error.

In addition to obtaining a perfect orientation of the stream of powder in relation to the laser, the measurements taken during step xii) make it possible to check the proper operation of the additive manufacturing device, in particular after a collision.

According to an improved embodiment, the method of the invention implements a system comprising three picture taking devices and comprises the steps consisting in:

xv. obtaining an image of the powder sprayed by means of the third picture taking device;

xvi. repeating steps xiii) and xiv) with the image obtained in step xv) instead of the image obtained in the step ix).

According to this same embodiment, the method of the invention comprises a step consisting in:

xvi. repeating steps x) and xi) with the image obtained in step xiv) instead of the image obtained in the step ix).

This improved embodiment of the method of the invention makes it possible to carry out a three-dimensional check and adjustment of the stream of powder and of the laser beam. Furthermore, according to this embodiment, the method of the invention advantageously comprises a step consisting in:

xvii. repeating steps x) and xi) with the image obtained in step xv) instead of the image obtained in step ix).

BRIEF DESCRIPTION OF THE DRAWINGS

The invention is disclosed hereinafter according to its preferred embodiments, which are in no way limiting, and in reference to FIGS. 1 to 5, wherein.

DETAILED DESCRIPTION OF THE EMBODIMENTS

Figure 1:
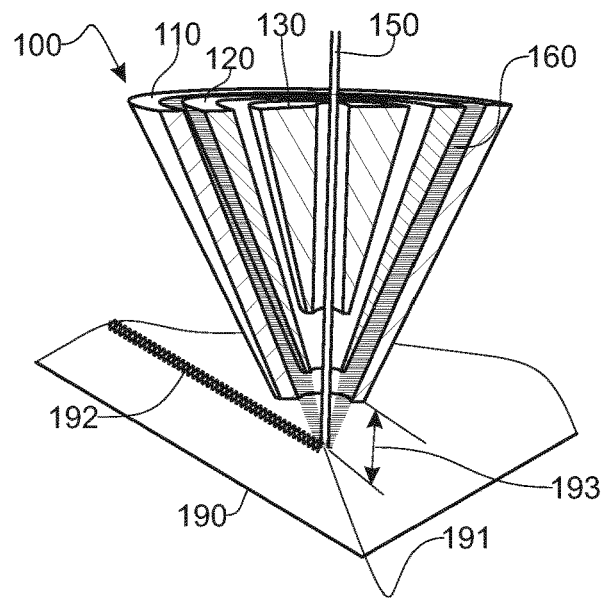
FIG. 1, relative to prior art, shows according to a cross-section principle view in perspective, an embodiment of the spray/fuse nozzle used in the CLAD® method.
Figure 2:
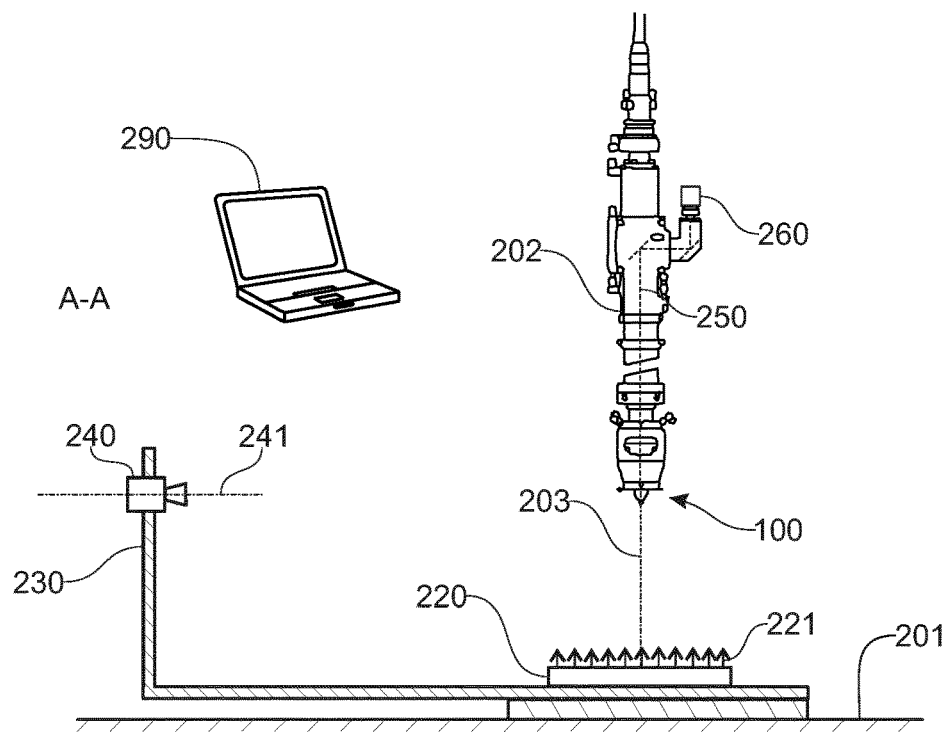
FIG. 2 shows a diagrammatical front view and according to a cross-section AA defined in FIG. 3, an exemplary setup of the system of the invention in an additive manufacturing machine.

FIG. 2, according to an embodiment, the system of the invention is installed in a machine-tool able to carry out additive manufacturing. By way of example said system is installed on the table (201) of said machine, whereon it is fixed by way of a magnetic support (210). According to alternative embodiments (not shown), said support is not magnetic and is clamped or bolted on the table, or permanently fastened onto the latter at a location that does not hinder the manufacturing operations. Said system comprises a light source (220). Said light source (220) emits a light beam (221) that is mostly directed perpendicularly to a lighting plane, a lighting plane that, according to this embodiment, is substantially parallel to the table (201) of the machine. According to alternative embodiments, the support is a V-shaped support, for example for installing the system on a cylindrical surface, or comprises means for adjusting the orientation thereof, and subsequently the orientation of the light source, with respect to the surface whereon it is placed.

For the implementation of the system of the invention, the additive manufacturing head (202) of the machine is positioned above the light source (220), in such a way that the direction (203) of the laser beam is substantially perpendicular to the lighting plane, said laser beam being, more preferably, centred with respect to the light source so as to obtain a uniform lighting of the nozzle (100).

According to this embodiment, a support arm (230), attached to the support (210) of the light source, makes it possible to place a video camera (240), more preferably digital, referred to as a profile camera, in such a way that the optical axis (241) of the camera is substantially perpendicular to the presumed direction (203) of the laser beam, therefore substantially parallel to the lighting plane, and said camera providing an image of the end of the spray nozzle (100) and of the stream of powder exiting from said nozzle. Alternatively, the profile camera is fixed in the machine independently of the support (210) of the light source, while complying with the orientation of its optical axis with respect to the presumed direction of the laser beam.

An optical path (250) is carried out in the additive machining head, allowing a second camera (260), referred to as the centring camera, to obtain an image through the powder spray orifice of the nozzle (100). On many machines implementing the CLAD method, this optical path (250) and the location for the installation of this second camera are preinstalled in such a way that no modification of the additive manufacturing head is required. The representation of the optical path FIG. 2 is a principle representation. In practice, said path is carried out in such a way that it does not interfere with the laser beam. Thus, the centring camera (260) produces an image such as seen through the nozzle (100). The adjusting of the camera, in particular of the focus and of the depth of field, of the optical path and of the position of the additive machining head (202) with respect to the light source (220) are such that the centring camera can view in the same image, with a sharpness adapted to the measurements taken, the perimeter of the powder spraying orifice and a materialisation of the position of the laser beam. This materialisation is obtained by the perforation of a target placed between the end of the nozzle (100) and the lighting plane. The perforation of said target is carried out by a reduced-power laser shot.

The two cameras (240, 260) are connected to an acquisition and processing system (290), for example a portable computer, making it possible to collect the images provided by said cameras and to carry out various processing on these images.

Figure 3:
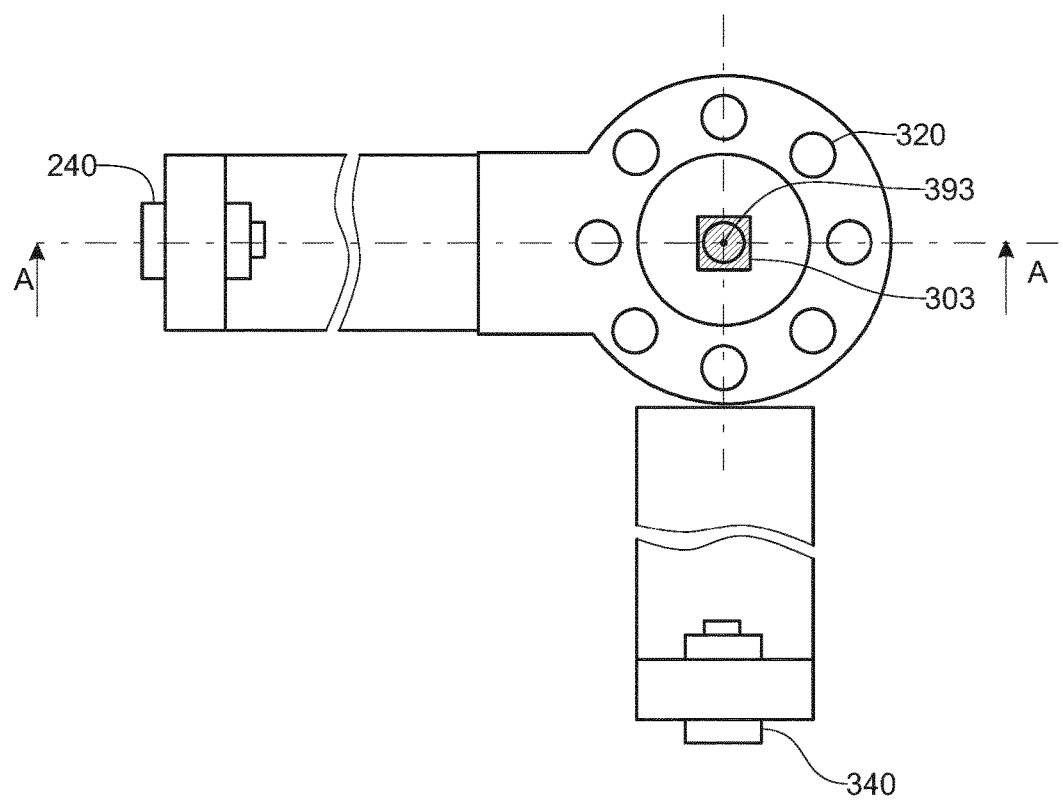
FIG. 3 shows according to a top view an embodiment of the system of the invention.

FIG. 3, according to an embodiment, the light source comprises a plurality of light sources (320), for example light-emitting diodes arranged on the lighting plane according to an annular configuration, with the additive manufacturing head being placed substantially at the centre of this ring. Such a light source makes it possible to obtain a lighting without a shadow of the nozzle with a darker central zone which makes it possible to view the target (303) better at the centre of the device. According to this embodiment, the target (303) is placed on the lighting plane. Said target is for example made of paper or of an adhesive strip that makes it possible to create a mark through a low-power laser shot on the target, less than 10 watts preferably less than 5 watts.

Said target (303) is placed on the path of the laser beam between the lighting plane and the outlet of the nozzle of the additive manufacturing head. The easiest positions for implementation are obtained when said target is placed on the lighting plane or on the outlet end of the nozzle. The target is stuck or held by a clamp (not shown). The low-power laser shot, produces on the target a burnt zone (393) that is darker or a substantially circular perforation.

According to a particular embodiment, the device of the invention comprises a second profile camera (340), sighting towards the nozzle of the additive manufacturing head, the optical axis of which is perpendicular to the presumed axis of the laser beam and substantially perpendicular to the axis of the first profile camera (240).

Figure 4:
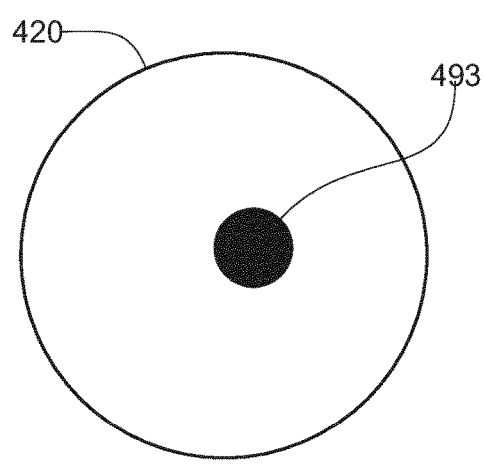
FIG. 4 shows the adjusting of the concentricity of the laser beam and of the nozzle by the image obtained by the centring camera.

FIG. 4, the image viewed by the centring camera comprises an illuminated ring (420) the perimeter of which corresponds to the powder expelling orifice, and a dark spot (493) corresponding to the mark left by the laser on the target. By way of the acquisition and processing means, the contours of these two spots, the lighted spot (420) and the dark spot (493), are for example assimilated with circles of which it is easy to measure the relative eccentricity. This measuring operation is carried out by the operator by viewing on the screen of the acquisition and processing means the image delivered by the centring camera. The identification of the two circles is carried out by the operator, for example my means of a graphics tool that allows for the superimposing of the outlines of said contours on the image obtained by the centring camera. In order to make a precise measurement, the acquisition and processing means advantageously receive from the centring camera as from the other cameras information such as the focal length of the lens used, the focus setting, the aperture and the resolution, without this list being exhaustive or limiting, this information making it possible to precisely calculate the reproduction ratio of the image displayed and therefore to carry out appropriate measures.

When the target is placed on the lighting plane, the adjusting is carried out by acting on the mechanical centring of the cones of the nozzle, and with the condition of not displacing the additive manufacturing head with respect to the device of the invention, any modification of the centring of the powder spray orifice is visible immediately without carrying out another laser shot, which makes it possible to adjust the nozzle with an image in real time. When the additive manufacturing device comprises an optical adjustment of the laser, for example by means of a lens, then the initial adjustment is calculated by means of image acquisition. Once the adjustment has been made, another shot is carried out. According to the latter embodiment, the ease of implementation is identical whether the target is placed on the end of the nozzle or on the lighting plane.

Figure 5:
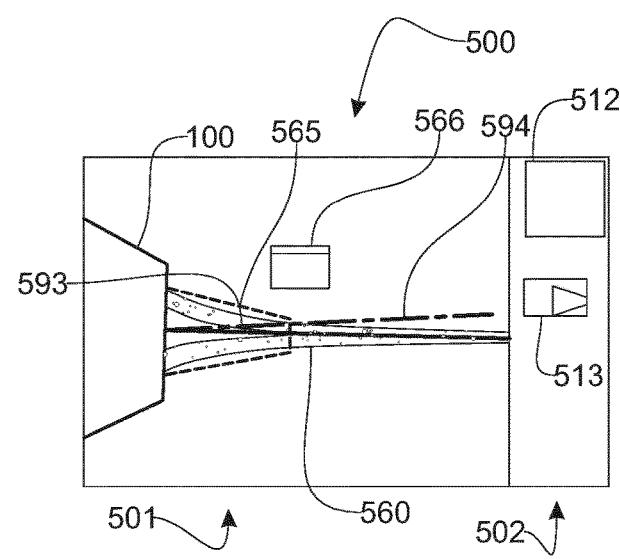
FIG. 5 shows an example of the screen displayed on the acquisition and processing means for the carrying out of the adjustments by means of the profile cameras.

FIG. 5, according to an embodiment the display screen (500) on the acquisition and processing means corresponding to one or the other of the profile cameras, comprises a first frame (501) representing the image seen by the profile camera. This image shows the end of the nozzle (100) of the additive manufacturing head, and when a stream of powder is sprayed by this nozzle, the profile camera makes it possible to view the image (560) of this stream of powder. If a laser beam is generated during the stream of powder, the lighting of the powdery particles allows for a viewing of the direction (593) of said laser beam. According to alternative embodiments, the image in this first screen of the nozzle and of the powder spray is an animated image that shows the powder spraying in real time and the shape of the stream according to the adjustment of the flow rates of powder and gas, or a still picture drawn from a powder spray test carried out previously.

The system of the invention advantageously comprises means of memory for recording and optionally time stamping the images or the films acquired by the various cameras as well as the adjustments carried out.

A second frame (502) of the screen allows the operator to access a set of tools including, for example, graphics tools for creating outlines on the image shown in the first screen (501). Using these tools, the operator, according to an embodiment, determines the profile of the image (560) of the stream of powder, according to a predetermined pattern (565), for example a trapeze. According to this embodiment, a label (566) displayed in the first frame (501) gives the operator a first level of information on the characteristics of the trapezium (565) identified as such. A display (513) in the second frame, provides the operator with information on the tool gauges deduced from the identified profile (565). These tool gauges are then entered manually by the operator, in the correction tables of the machine, or, more advantageously, the acquisition and processing means include a data exchange interface with the command control of the machine and the correction tables of the machine are immediately updated by the transfer of numerical values identified once the operator has validated the measurement. These gauges consist for example in the length of the trapezium, the width of its large base, similar to the large diameter of the stream of powder and the width of its truncated apex, similar to the small diameter of the tapered stream.

The image in the first frame (501) also makes it possible to detect the case of a laser beam (594) that would be incorrectly oriented in relation to the stream of powder, and if needed to calculate the adjustments required in order to re-establish this orientation.

When the system of the invention comprises two profile cameras these various adjustments and controls are carried out using images provided by each one of said profile cameras.

The description hereinabove and the embodiments, show that the invention achieves the targeted purpose, namely it makes it possible to greatly facilitate the various adjustments in the positioning of the laser with respect to the nozzle. The invention is presented here in the framework of an additive manufacturing machine, but it can also be adapted to the adjusting of the concentricity and of the orientation of a laser cutting nozzle with respect to said cutting laser. The images as well as the adjustments are advantageously archived in memory means in order to ensure traceability of the manufacturing carried out.

The invention claimed is:

1. A method for adjusting and measuring a material spray/fuse device via a direct additive laser construction method utilizing a system comprising:
   a powder spray nozzle;
   a laser beam passing through a center of the powder spray nozzle;
   a light source to provide a light beam substantially perpendicular to a lighting plane, and comprising a support to position the light source with respect to a material surface;
   a first profile camera installed such that its optical axis is substantially parallel to the lighting plane;
   a projector to project a view seen by the center of the powder spray nozzle on an optical path;
   a centering camera with its optical axis placed on the optical path;
   a target markable by a laser shot and
   an acquisition and processing unit configured to collect images from the first profile camera and the centering camera;
   the method comprising steps of:
      positioning the powder spray nozzle above the lighting plane according to an orientation that is substantially normal to the lighting plane;
      placing the target between an outlet of the powder spray nozzle and the lighting plane such that the target intercepts the laser shot;
      delivering the laser shot to the target by a laser, the laser beam passing through the center of the powder spray nozzle;
      lighting an end of the powder spray nozzle by the light source; and
      obtaining an image, through the end of the powder spray nozzle by the centering camera, of a mark left by the laser shot on the target while the end of the powder spray nozzle is lit.

2. The method according to claim 1, wherein the target is on the end of the powder spray nozzle.

3. The method according to claim 1, wherein the target is held on the lighting plane.

4. The method according to claim 1, further comprising steps of measuring a centering error between a contour of an image of the lighted end of the powder spray nozzle and the image of the mark left by the laser on the target; and
   calculating an adjustment to correct the centering error by the acquisition and processing unit.

5. The method according to claim 1, further comprising steps of spraying a stream of powder from the powder spray nozzle and obtaining an image of the stream of powder sprayed from the powder spray nozzle by the first profile camera.

6. The method according to claim 5, further comprising steps of determining, from the image of the stream of powder obtained by the first profile camera, a shape of the stream of powder in accordance with a predetermined profile;
   and determining tool gauges corresponding to the stream from the determined shape of the stream.

7. The method according to claim 5, further comprising steps of:
   generating the laser beam during spraying of the stream of powder;

measuring, on the image of the stream of powder obtained by the first profile camera, an orientation deviation of the image of the stream of powder with respect to an image of the laser; and determining adjustments to be carried out to correct the orientation deviation of the laser beam with respect to the stream of powder.

8. The method according to claim 7, further comprising steps of obtaining an image of the stream of powder by a second profile camera, an optical axis of the second profile camera is parallel to the lighting plane and perpendicular to the first profile camera; measuring, on the image of the stream of powder obtained by the second profile camera, the orientation deviation of the image of the stream of powder with respect to an image of the laser; and determining adjustments to be carried out to correct the orientation deviation of the laser beam with respect to the stream of powder.

9. The method according to claim 8, comprising steps determining, from the image of the stream of powder obtained by the second profile camera, a shape of the stream of powder in accordance with a predetermined profile; and determining tool gauges corresponding to the stream from the determined shape of the stream.

10. The method according to claim 1, wherein the light source comprises a plurality of light-emitting diodes according to an annular arrangement in the lighting plane.

11. The method according to claim 2, where in the system further comprises a second profile camera with its optical axis parallel to the lighting plane and perpendicular to the first profile camera.

* * * * *